June 16, 1942.　　　J. A. C. YULE　　　2,286,779
PHOTO-MECHANICAL COLOR REPRODUCTION
Filed April 5, 1940
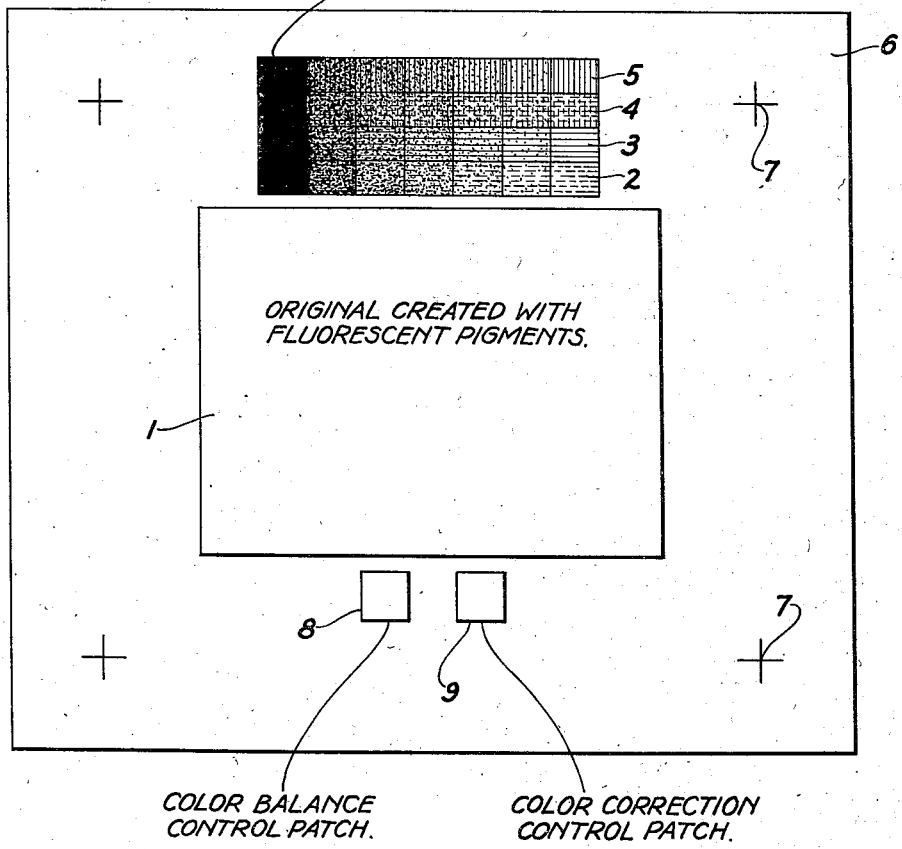
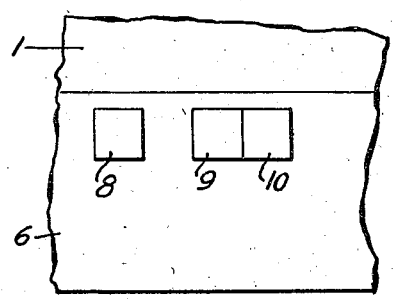
John A. C. Yule
INVENTOR Patented June 16, 1942

2,286,779

UNITED STATES PATENT OFFICE 2,286,779

PHOTOMECHANICAL COLOR REPRODUCTION

John A. C. Yule, Rochester, N. Y., assignor to Eastman Kodak Company, Rochester, N. Y., a corporation of New Jersey Application April 5, 1940, Serial No. 328,067

11 Claims. (Cl. 88—14)

This invention relates to photo-mechanical color reproduction and to means for testing the quality of fluoro-activating light.

In U. S. Patents 2,008,290, and 2,108,503, Alexander Murray describes a method of color reproduction in which the original is created with artists' colors including fluorescent ingredients to compensate for deficiencies in their reflecting powers and this original is photographed partly by ordinary reflected light and partly by fluorescent light caused by illuminating it with ultra-violet light.

It is a particular object of the invention to provide a method and means for testing the illumination used in the above process to determine the quality thereof, i. e., to determine when the ratio of ultra-violet to visible light is such that correct color reproduction will be produced.

Broadly, the object of the invention is to provide a method and means for testing any fluoro-activating light to determine whether it has certain predetermined qualities.

According to the invention there are provided two patches or areas one of which is fluorescent and the other of which is non-fluorescent. Incidentally, and to a slight degree, the term "fluorescent" is relative since some pigments fluoresce when illuminated by one wave length (one fluoro-activating band of the spectrum) and others require different wave lengths to cause fluorescence. However, in general in order to test whether a given light beam is of a certain quality, i. e. contains a certain ratio of fluoro-activating light to light of some particular non-fluoro-activating portion of the spectrum, the two patches must have the same color only when illuminated by light of that certain quality. This means that the fluorescent patch fluoresces in the non-fluoro-activating portion in question. The matching of color may extend throughout the whole visible spectrum, but since the important factor is only this particular non-fluoro-activating portion of the spectrum, it is sufficient to have the color match only over this portion, or even a smaller portion thereof. The test is made in either of the latter cases by viewing the patches through a suitable color filter.

For example, to test whether a given light beam contains a certain ratio of green to ultra-violet, two patches are used one of which reflects green light but is non-fluorescent and the other of which absorbs green at least partially but fluoresces green when illuminated by ultra-violet. The patches are colored so that the reflection of green from the non-fluorescent patch matches the reflection plus fluorescence of the fluorescent patch only when illuminated by light of said certain quality. The test is made by viewing the patches throughout a green filter or, if they also happen to match throughout the rest of the visible spectrum at the same time, no filter is needed. A similar check should be made on the ratio of red to blue by using a material which fluoresces red when illuminated with blue light and by viewing through a red filter.

In photo-mechanical work, not only is a visual check on the light quality useful but also the photographic effect of this quality is of primary importance as a final check. It is therefore desirable that the control patches not only match visually in color but also match in some way (e. g. give equal density) when measured photographically. In color reproduction the photographic measurement is made through a primary color filter and the match in density should result for each of the primary color filters or at least for one of them.

A more general embodiment of the invention employs three or more patches only one of which is fluorescent and is adjacent to each of the others. The fluorescent patch is matched against one of the non-fluorescent patches visually and against a different or the same patch photographically through each of the primary color filters. In fact the fluorescent patch may match one patch visually through one filter, another patch visually through a different filter, a third patch photographically through one filter and so on. Anyone of the non-fluorescent patches may combine two or more of these checks and I have found that two or three patches including the fluorescent one are generally sufficient. It is usually preferable to have one or more of the non-fluorescent patches or areas, white.

According to an embodiment of the invention applied specifically to the process described in the above-mentioned Murray patents wherein the ratio of ultra-violet to green and blue is important, the non-fluorescent patch is white or at least reflects blue and green strongly and the fluorescent patch adjacent thereto absorbs green and blue at least partially and fluoresces these colors when illuminated by ultra-violet. These patches or areas when illuminated by light of the correct quality, match in color when viewed through either a green or a blue filter and match in density when photographed through primary blue or primary green. The viewing filters are not necessarily primary filters, but should correspond to a portion of the primary color in each case.

Thus an original painting created with artists' colors including fluorescent ingredients to compensate for deficiencies in their reflecting powers together with the two patches according to the invention gives a combination which permits even a worker unskilled in color correction to produce accurate color separation negatives for photomechanical reproduction processes. These patches remove most of the need for the gray and colored step tablets often used in this connection and the tedious density measurements associated therewith. The rest of this need can be practically entirely eliminated by adding to this combination a third patch which is dark blue-green in color and by photographic measurement has densities to the primary colors equal respectively to the lowest neutral densities which reproduce as a solid tone in the corresponding subtractive colors in a correctly color-balanced half-tone reproduction of the original. This extra patch acts as a check on color balance and correct color balance is obtained when this patch reproduces as a solid in all three color printing plates.

Thus both correct color balance and the correct amount of color correction are checked merely by matching the visual colors or the photographic effective densities of various pairs of patches.

In actual practice the non-fluorescent patches are not necessarily absolutely non-fluorescent but may have a low fluorescence. The term "non-fluorescent" is here used to include all patches which are practically non-fluorescent.

The advantages of various embodiments of the invention will be understood from the following description when read in connection with the accompanying drawing in which:

Fig. 1 is a copyboard incorporating the invention.

Fig. 2 is a section of a copyboard incorporating a different embodiment of the invention.

In the drawing an original painting 1 created with artists' colors including fluorescent ingredients to compensate for deficiencies in the normal reflecting powers of the colors is mounted on a copyboard 6 which is for example a white card. According to the prior art most of the control of color balance and color correction was determined from fluorescent gray, blue-green, yellow, and magenta step tablets 2, 3, 4, and 5 respectively mounted on the copyboard adjacent to the original. Accurate control using such step tablets requires density measurements of the original and of every color separation negative or positive made. Indicia in the form of crosses 7 aid in registration of the color separations in the well-known way.

According to the invention, a color correction control patch 9 is mounted adjacent to a white area of the mount 6. In the drawing, the mount 6 consists entirely of a white card and hence no special white area is indicated. The patch 9 is fluorescent and the white card adjacent thereto constitutes the non-fluorescent patch to be matched with the patch 9 in accordance with the invention. Actually the white card fluoresces very slightly but this is so small that its effect is negligible or can be compensated for by increasing the fluorescence of the fluorescent patch. In any case, the term "non-fluorescent" is intended to cover any patch such as the white card which for the purpose of the present invention is practically non-fluorescent.

In reproducing the original 1, it is desirable to make each of the color separation negatives by a single exposure instead of by two separate exposures, one to ordinary visible illumination (through a proper color separation filter) and the other, a correcting exposure to fluorescent light obtained by ultra-violet illumination. Hence the source of illumination must contain the correct ratio of ultra-violet, green and blue light, etc. Inspection of the sketch or original 1 itself through the primary color filters or measurements of densities in the color separation negatives gives some information, but neither constitutes an accurate method of judging whether the separations are overcorrected or undercorrected. The color correction control patch 9 provides means whereby the proportion of ultra-violet to visible light may be accurately judged. This color control patch strongly absorbs one portion of the spectrum for example blue and green and has a strong fluorescence in this absorbed region, that is, it has a strong blue and green fluorescence when illuminated by ultra-violet light. When viewed either directly or through a suitable green or blue filter, this paint exactly matches the white area adjacent thereto if the proportion of ultra-violet to green and blue light respectively is correct.

Several variations of this simple arrangement are possible. As a first embodiment, the patch 9 may comprise a paint which has the same density as the white area adjacent thereto when properly illuminated and when photographed through primary color filters, i. e. the two patches may match in density in the separation negatives. This same patch should match the white area visually in color when viewed through a green filter or through a blue filter.

By way of example, I have found that a paint comprising 0.1 part by weight of Fanchon yellow, 0.2 part Process red, Lewis Roberts dry pigment, and 3.5 parts chrysene containing 0.15 per cent naphthacene, when made up in a suitable vehicle such as ten parts of an aqueous solution of gum arabic containing small amounts of phenol, glycerine and Darvan or other dispersing agents is quite satisfactory. In ordinary light, this patch has a light pink color, but under the correct quality of fluoro-activating light matches a white background when measured photographically through the primary color filters or when viewed through a green combination of Wratten filter 8 and Corning filter 503 or through a blue combination of Wratten filter 2A, Wratten filter 35 and Corning filter 503.

Although this embodiment has many advantages over any of those to be described, it is a little difficult to use because of the high density of the blue filter combination mentioned. A second embodiment of the invention increases the violet fluorescence of the patch by adding chrysene containing no naphthacene. That is, the chrysene must be recrystallized directly without adding any naphthacene, in accordance with my copending application Serial No. 328,068, filed concurrently herewith, in which I state: The chrysene which is commercially available on the market is about 12% soluble in solution naphtha when boiling. A decolorizing carbon is added to such a solution, the solution is boiled and the chrysene recrystallized therefrom. If a violet fluorescence is required, five parts of maleic anhydride is added to the solution for every hundred parts of chrysene and boiled for fifteen minutes. This step destroys any naphthacene which may be present. With this second embodiment, a less dense blue filter may be used during visual matching and the fluoro-activating light would have the correct quality when this patch matches the white background through this less dense filter. However, when its density is measured photographically through the primary blue filter it will appear too dense compared to the background. It still gives a satisfactory check photographically through a primary green filter.

A third embodiment of the invention has a still more powerful fluorescence by increasing the percentage of chrysene until the patch 9 matches the background 6 without any visual filters when the quality or composition of the light is correct.

Since the first modification is the preferable one except for the difficulty of viewing through the dense blue filter, the following variation thereof shown in Fig. 2 permits its use without this difficulty. Adjacent to the color patch 9 is mounted another patch 10, which additional patch 10 is to be compared with the patch 9 during visual examination, thus permitting direct examination or the use of a very light filter. On the other hand in the color separation negatives, the patch 9 would be compared with the background 6. Thus the patches 9 and 10 and the background 6 comprise three areas which when illuminated by light of the proper quality are such that two of the patches match visually in color and two of the patches match photographically in density.

Since the patch 9 made up in accordance with the first embodiment has a light pink color when viewed either by white light or by fluoro-activating light the intensity of the fluorescent light is not sufficient to complement the pink color fully so as to make the patch appear white. Therefore, the auxiliary patch 10 must also have a light pink or yellow color as it is only the blue fluorescence which is visually weak. That is, without having any fluorescent pigments incorporated therein, the patch 10 must have the same color as the patch 9 under the correct quality of fluoro-activating light. In ordinary white light, the patch 10 appears a lighter pink than the patch 9. In any of these embodiments the ratio of the amount of pigment to the amount of fluorescent material is proportional to R where R is the desired ratio of ultra-violet (fluoro-activating wave lengths) to visible light. The proportionality factor depends on the efficiency of the fluorescent material and on the hue of the filter, if any, which is to be used for viewing, i. e, to restrict the visible light.

The combination of any of these embodiments of this invention with a second color patch 8 which is to permit the control of the color balance in the separation negatives, provides a copyboard which permits easy and direct control of color separation negatives without the tedious measurement of individual steps of a step tablet such as shown in 2, 3, 4, or 5. This elimination of the need for any step tablets (except a grey scale which is still useful for control of the density range and for checking the neutrality of intermediate grays) is provided by having along with the color correction control patch 9, this color balance control patch 8 whose color is a very dark blue-green which by photographic measurement has densities to the primary colors equal respectively to the lowest neutral density which reproduces as a solid tone of the corresponding subtractive color in a correctly color-balanced reproduction of the original 1. This lowest neutral density is determined for any process by actual measurements on a non-fluorescent grey tablet, but having once been so determined the gray scale need not be tested again in this connection except possibly as a check on the process. It happens that correct color balance will be obtained in the above-mentioned process described in the Murray patents if in the three color plates (yellow, magenta, and blue-green) a solid tone corresponds to densities of 1.12, 1.08, and 1.28 respectively in a non-fluorescent gray scale associated with the original. The patch 8 is made up to have these particular densities when measured respectively through blue, green and red filters. A brief consideration of the mathematics involved will show that the correct color balance will be obtained if this patch reproduces as a solid (in halftones a solid is the maximum density) in all three printing plates.

In all negatives and positives, the difference in density between this patch 8 and the white background may be taken as the density range and should be equal for all three colors. The patch itself will be a very dark bluish green in color and will normally reproduce as a dark brown. Thus patches 8 and 9 (and possibly 10) and the background 6 provide all the control that is required in routine copying, eliminating the need for the step tablets 2, 3, 4 and 5 and the tedious density measurements associated therewith. That is, the three patches are sufficient control for most purposes although a non-fluorescent gray step tablet may sometimes be required in checking tone quality.

By way of example, the following composition given in parts by weight has been found to be satisfactory for the color balance control patch 8. Carbon black (one part) Burnt umber (two parts) Milori blue (ten parts) Fanchon yellow (two parts) Titanox (ten parts) in a suitable vehicle such as 30 per cent aqueous solution of gum arabic (thirty parts.)

Having thus described the various embodiments of my invention, I wish to point out that it is not limited to any specific one of these, but is of the scope of the appended claims.

What I claim and desire to secure by Letters Patent of the United States is:

1. A device for determining whether fluoro-activating light is of a certain quality comprising a strongly fluorescent color patch which strongly absorbs from light incident thereon the color which it fluoresces, a non-fluorescent color patch and means for supporting the two patches adjacent to one another, the visual color of the two patches being the same over at least a substantial portion of the spectrum only when illuminated by light of said certain quality.

2. A device for determining whether fluoro-activating light is of a certain quality, comprising three adjacent color patches one of which is strongly fluorescent and absorbs from light incident thereon the color which it fluoresces, and the other two of which are non-fluorescent, the visual color of one of the non-fluorescent patches being light and the same as that of the fluorescent patch at least over a portion of the spectrum, only when illuminated by light of said certain quality and the other non-fluorescent patch being the darker of the two and having the same apparent density as the fluorescent patch when illuminated by light of said certain quality and photographed through a primary color filter.

3. A device for determining whether fluoro-activating light contains a certain relative proportion of light of one non-fluoro-activating spectral band to light of one fluoro-activating spectral band comprising two adjacent color patches, one of which strongly absorbs said non-fluoro-activating band from light incident thereon and fluoresces this band when illuminated by said fluoro-activating band and the other reflecting said non-fluoro-activating band, the reflectivity and fluorescence in said non-fluoro-activating band of said one color patch when illuminated by light of said certain relative proportion matching the reflectivity of said other patch illuminated by the same light.

4. A device according to claim 1 in which the non-fluorescent color patch is white.

5. A device according to claim 1 in which the visual colors of the two patches are the same throughout the visual spectrum when so illuminated.

6. A device according to claim 2 in which at least one of the non-fluorescent patches is white.

7. A device for determining whether light contains a certain relative proportion of ultra-violet to blue or green light comprising a color patch which strongly fluoresces green and blue when illuminated by ultra-violet light and which absorbs green and blue light strongly and adjacent thereto a non-fluorescent color patch which reflects green and blue light, the two patches matching in color in the green and blue regions of the spectrum only when illuminated by light of said certain relative proportion.

8. A device for determining whether light contains a certain relative proportion of ultra-violet to blue or green light, comprising three adjacent color patches one of which strongly fluoresces green and blue when illuminated by ultra-violet light and which absorbs green and blue light strongly and the other two of which are non-fluorescent and reflect green and blue light, one of the two non-fluorescent patches matching the fluorescent patch in color when illuminated by light of said certain relative proportion and viewed through a green filter, one of the two non-fluorescent patches matching the fluorescent patch in color when so illuminated and viewed through a blue filter, one of the two non-fluorescent patches matching the fluorescent patch in density when so illuminated and photographed through a primary blue filter and one of the two non-fluorescent patches matching the fluorescent patch in density when so illuminated and photographed through a primary green filter.

9. A device for determining whether fluoro-activating light is of a certain quality comprising a fluorescent color patch and a non-fluorescent color patch adjacent to one another, the visual color of the two patches being the same over at least two different substantial portions of the spectrum only when illuminated by light of said certain quality, each of said portions being substantially a primary color.

10. A device for determining whether fluoro-activating light contains a certain relative proportion of light of one non-fluoro-activating spectral band to light of one fluoro-activating spectral band or for determining whether it contains another certain relative proportion of light of a different non-fluoro-activating spectral band to light of said fluoro-activating band, comprising two adjacent color patches, one of which strongly absorbs both of said non-fluoro-activating bands and fluoresces these bands when illuminated by said fluoro-activating band and the other patch reflecting both of said non-fluoro-activating bands, the reflectivity and fluorescence in said one non-fluoro-activating band of said one color patch when illuminated by light of the first mentioned certain relative proportion matching the reflectivity of said other patch illuminated by the same light and the reflectivity and fluorescence in said different non-fluoro-activating band of said one color patch when illuminated by light of said another certain relative proportion matching the reflectivity of said other patch illuminated by the last mentioned light.

11. A method for determining whether fluoro-activating light is of a certain quality which comprises illuminating with said light, two color patches adjacent to one another, one of which fluoresces and absorbs from the incident light the color which it fluoresces and the other of which is non-fluorescent and is of the same visual color as the fluorescent patch over at least a substantial portion of the spectrum only when illuminated by light of said certain quality, viewing the two patches simultaneously through means transmitting only said portion of the spectrum and noting whether the patches have the same visual color.

JOHN A. C. YULE.